Dec. 7, 1965 R. A. SKOV 3,222,659
VARIABLE DENSITY DATA RECORDING UTILIZING
NORMAL SKEW CHARACTERISTICS
Filed June 30, 1961
3 Sheets-Sheet 1

INVENTOR
RAYMOND A. SKOV
BY Melvin P. Williams
AGENT

Dec. 7, 1965 R. A. SKOV 3,222,659
VARIABLE DENSITY DATA RECORDING UTILIZING NORMAL SKEW CHARACTERISTICS
Filed June 30, 1961 3 Sheets-Sheet 2
FIG. 3a WRITING CIRCUITS
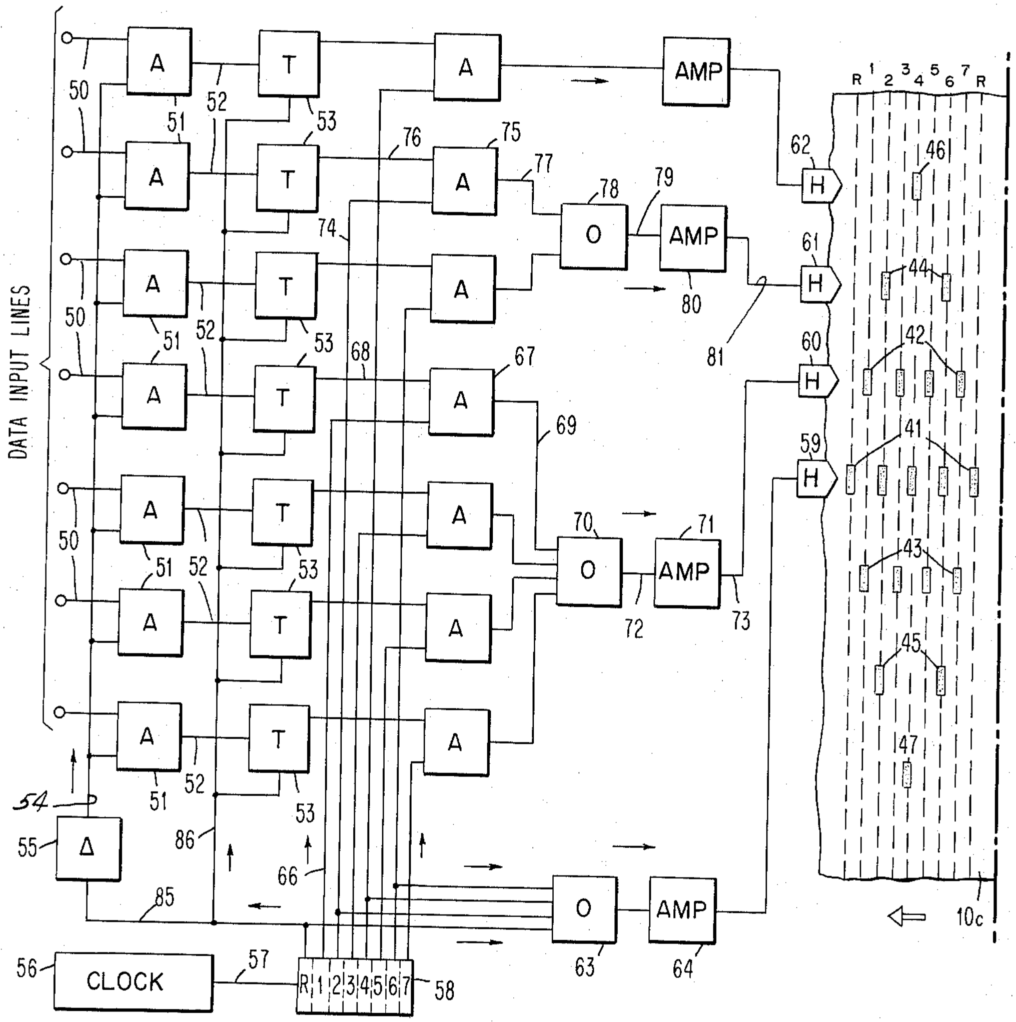
FIG. 3b WRITING TIMING
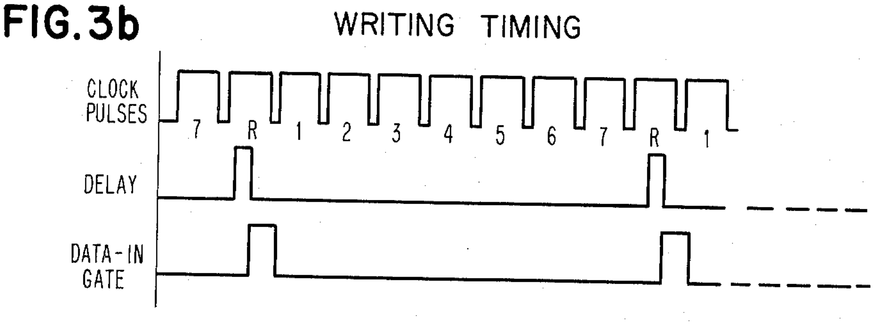

READING CIRCUITS 3,222,659

VARIABLE DENSITY DATA RECORDING UTILIZING NORMAL SKEW CHARACTERISTICS

Raymond A. Skov, Poughkeepsie, N.Y., assignor to International Business Machines Corporation, New York, N.Y., a corporation of New York Filed June 30, 1961, Ser. No. 121,050

8 Claims. (Cl. 340—174.1)

Figures 1A, 1B, 2:
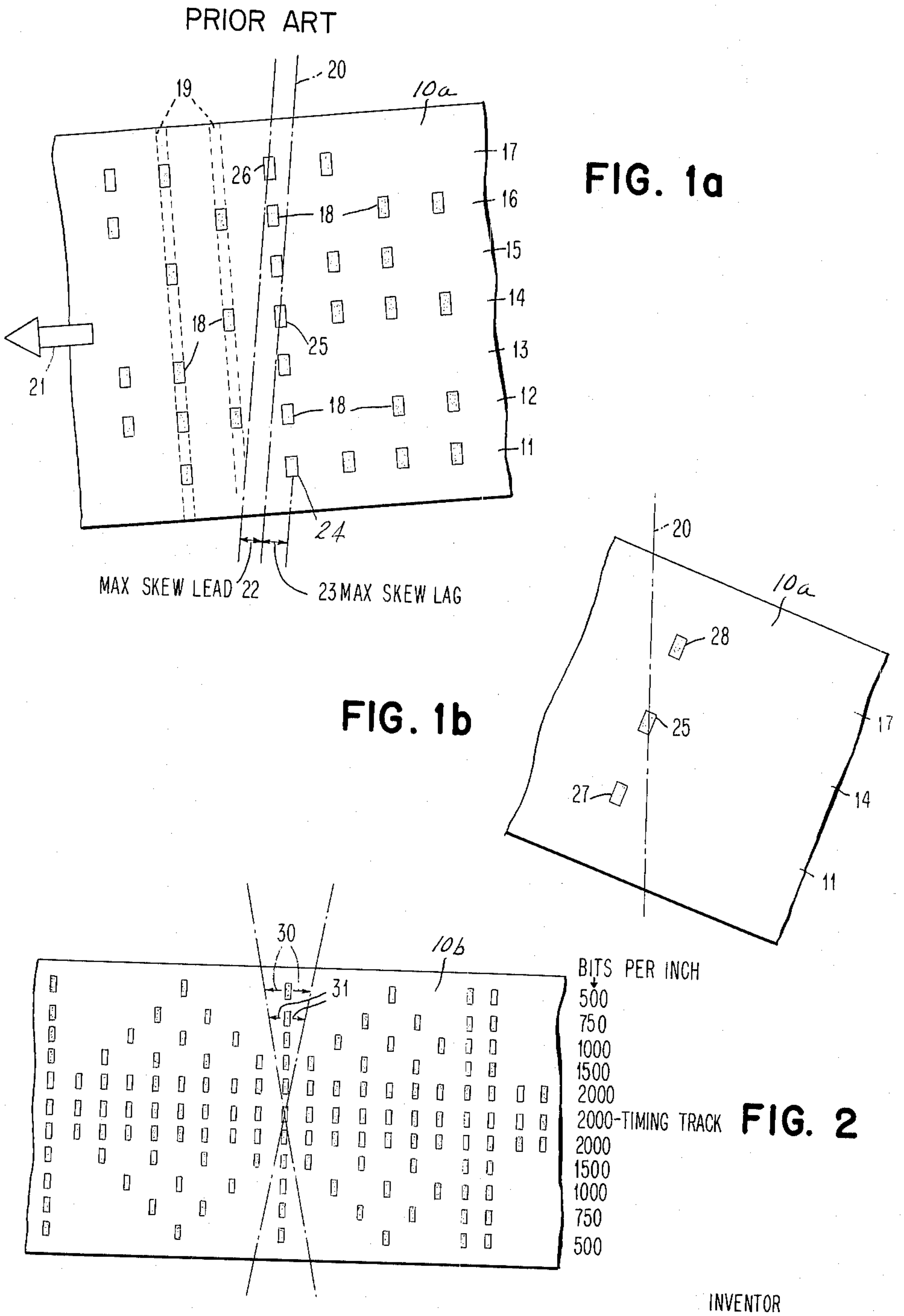

This invention relates to data recording and, more particularly, to a method and means for recording data manifestations in high density patterns in accordance with the uncorrected skew characteristic of a data record.

In the transmission of physical records in data processing machinery, the normal tolerances of the machine may permit the record to approach reading and/or writing stations at an oblique angle. This phenomenon is called "skew."

Although skew may occur in many different types of machines, the effects of skew are more harmful in machines characterized by high densities. Additionally, the effects of skew are more significant in high speed record handling machines since the minor physical displacement of signal areas on the record may result in a large part of a machine unit of time; the faster the machine operates (the fewer number of microseconds allotted to each bit of information) the more harmful are the effects of skew.

Many approaches to the skew problem have been taken, including provision of skew alarms, which indicate a skew condition in excess of that which the machine can handle. Sometimes, use is made of skew accommodation circuitry which recognizes the various bits of information in a single transverse row (or frame) appearing at different times within an acceptable range of time, keeps track of the row (or frame) with which the bit was associated, and then issue all of the data manifestations for a row (or frame) simultaneously, after the period of possible receipt of data for that row (or frame) has ended. This method requires a large number of registers and other associated complex equipment and is, therefore, quite expensive. Furthermore, in a data record system where a great number of tracks, columns or rows are used, the amount of equipment required becomes prohibitive. Simpler skew accommodation has been achieved, but only in systems which always have a data manifestation at each index position.

In any data processing apparatus, it is necessary to define a maximum amount of permissible skew, hereinafter called the maximum potential skew, within which the data can be properly sensed. Once this is done, the density of data manifestations (i.e., the spacing of manifestations along the length of the record) is fixed, and this spacing frequency defines the maximum density for data manifestations on the record. Stated alternatively, the recording density can be no greater than that prescribed by the maximum time which can be allotted to accommodate for the maximum allowable skew condition the apparatus is designed to accept, i.e., the maximum potential skew.

An object of this invention is to provide a simplified increase in the data bit density on data records to a density higher than that formerly possible for a given permissible maximum skew condition, i.e., for a given maximum potential skew.

Another object is to provide increased density data recording.

Another object is to provide a method of data recording which permits the density of data bits to be greater than that presently obtainable for a given maximum potential skew without special skew accommodation means.

Still another object is to provide increased density recording of data manifestations associated in word groups which are arranged serially along a record.

Although skew is a constant angle over a transverse section of a record at a single instant, if the center track is taken as a reference point, the tracks immediately adjacent to the center track will have a small skew characteristic in terms of linear length of record and the extreme tracks will have a greater skew characteristic in terms of linear length. Therefore, a portion of a skewed record can normally be thought of as pivoted about a point which is coincident with the longitudinal center line of the record. This being so, data manifestations which are recorded along the center line of the record will appear at a given read or write station at consistent intervals without regard to the amount of skew of the record. Similarly, data manifestations recorded at the extreme edges of the record will either lead or lag the data manifestations at the center of the record by an amount equal to the skew which the record is experiencing. It follows that a data manifestation in the center of a record need have only a very narrow range of time within which it can be recognized, and accordingly, data manifestations recorded on the extreme edges of the record may appear at greatly differing times. Thus, it is the amount of time necessary to recognize all possible data manifestations on the outside track which determines the density of the bits on any of the tracks when present methods of recording data manifestations in a line transverse with respect to the record are employed.

In accorrdance with the present invention, data is recorded on the various tracks of a record at densities which are inversely proportional to the maximum potential linear skew which can occur in each track within the skew accommodation limits of the data processing apparatus with which the record is to be used.

More specifically, data manifestations on the outside track are spaced from each other by the amounts which are the linear equivalents to the maximum skew permissible in the data processing apparatus, i.e., the maximum potential skew. Data manifestations on a reference track are spaced much more closely, the spacing being limited by other factors, such as the high frequency recording characteristics of magnetic heads, the size of punches, sensing brushes, or photoelectric cells, or other physical manifestation limits. Data manifestations on tracks between the reference track and the outside track or tracks, (on either side of the reference track) are spaced by proportional amounts, depending on the amount of maximum potential linear skew possible at that distance from the center of the record, i.e., the maximum amount of linear skew possible at that distance from the center of the record.

The present invention includes apparatus for making one track a reference point for defining skew, whereby the data processing apparatus will handle skew conditions on opposite sides of the reference track as being respectively leading or lagging (or vice versa) the central track. Further, apparatus is provided for utilizing the record itself as a means of synchronizing the otherwise asynchronous reading and writing equipment. This invention maintains the ability to have a unit record, or group of bits, all on one discrete transverse section (or frame) of the record surface.

Utilization of this invention permits greater densities on a given record within a given recording apparatus, the density achieved being the highest which may be achieved without skew accommodation means, limited only by the maximum skew acceptability characteristic of the apparatus in which the invention is used. Contrary to conventional skew accommodation, the advantages of utilizing the invention increase directly as the number of tracks on the record increases. Furthermore, this invention may be utilized in a variety of forms, the exact method and apparatus to be used being determined primarily by the other design parameters of a given data processing system.

As before described, the advantages of this invention are greater in data processing machines utilizing high density record apparatus. For this reason, the invention is shown, by way of example, in a magnetic tape handling apparatus; further, in order to simplify the presentation of the concept of the invention, the embodiment shown is a magnetic tape apparatus employing discrete magnetized areas as data designations on the tape. It should be understood that the invention is equally applicable in magnetic tape handling machines using the "non-return to zero" type of data recording, or any other magnetic condition method, as well as in punched card and tape, and mark-sensing type of data processing machines.

The foregoing and other objects, features and advantages of the invention will be apparent from the following more particular description of preferred embodiments thereof, as illustrated in the accompanying drawings.

Figure 4A:
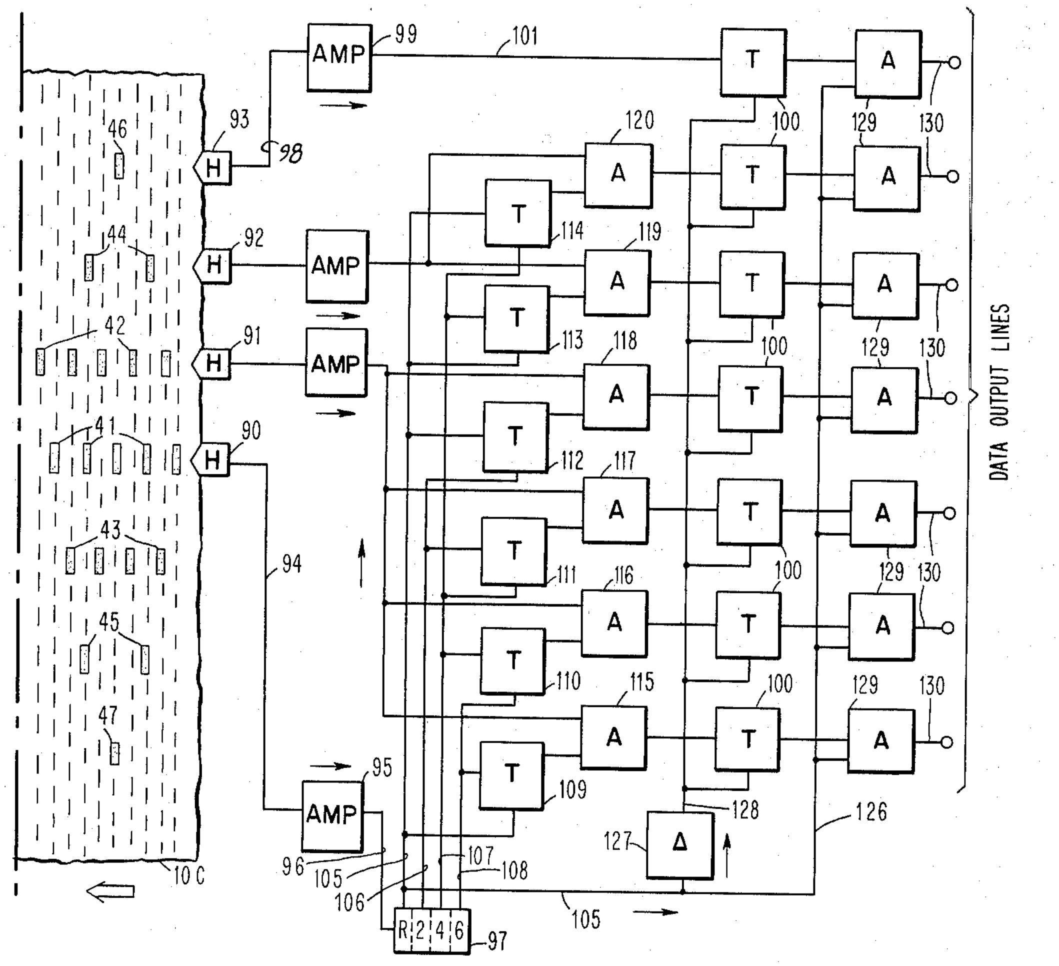
Figure 4B:
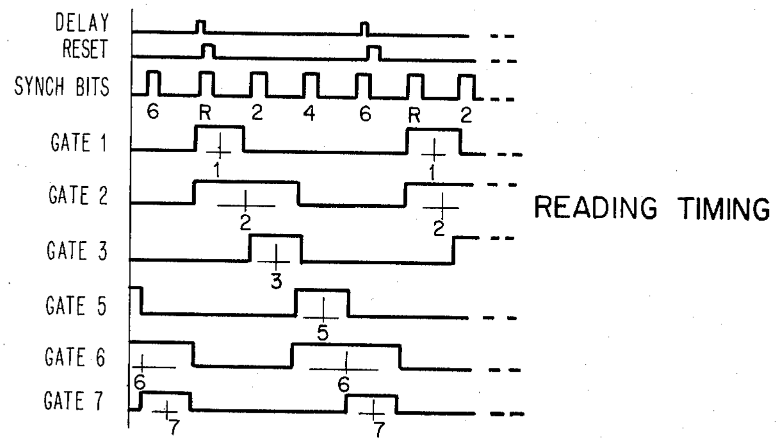

In the drawings:

FIG. 1*a* is a schematic diagram of a record indicating a skew condition;

FIG. 1*b* is a schematic diagram of a record indicating a skew condition opposite to that shown in FIG. 1*a*;

FIG. 2 is a schematic diagram of a data record illustrating an example of a data pattern which may be utilized to increase recording densities in accordance with one embodiment of the invention;

FIG. 3*a* is a schematic diagram of an illustrative embodiment of apparatus for writing data bits in increased density patterns in accordance with the present invention;

FIG. 3*b* is a timing diagram illustrating the timing of the writing circuitry of FIG. 3*a*;

FIG. 4*a* is a schematic diagram of illustrative reading circuitry for sensing the high density data of the type which may be recorded on a record by the circuitry of FIG. 3*a*;

FIG. 4*b* is a diagram illustrating the timing of the reading circuits shown in FIG. 4*a*.

Referring to FIG. 1*a*, a magnetic record 10*a* contains a plurality of data tracks 11–17 within which data bits 18 may be selectively manifested. For purposes of illustration, the record 10*a* may be considered to be a magnetic tape and the data manifiestations 18 (hereinafter referred to as data bits) may be considered discrete magnetized areas thereon. In the customary magnetic tape system, as well as in other data processing systems, the data bits are usually arranged in rows 19, each of which contains a character or other group of related data bits. A condition of skew exists when the bits 18 in a given row 19 do not all arrive at a read or write station simultaneously. In FIG. 1*a*, a transverse line 20 (which illustrates the position of a read-write station, for example) shows that certain of the data bits 18 may arrive at a given point along the path of the record 10*a* earlier than others. With the record moving in the direction show by the arrow 21, the data bit 26 (in the track 17) will be the first to reach the transverse line 20, the data bit 24 (within the track 11) will be the last to reach the transverse line 20, and the data bit 25 (recorded in the center track 14) will arrive at the transverse line 20 halfway between bit 24 and bit 26. Therefore, a maximum leading skew distance (illustrated by the arrow 22) occurs for data bit in the track 17 and a maximum lagging skew distance (illustrated by the arrow 23) exists for the data bits in the track 11. When the record 10*a* is skewed, each row 19 on the record can be thought of as being pivoted about a center point coincident with the data bit in that row which falls within the center track 14. In order to accommodate the bit 23 with the maximum lagging skew shown in FIG. 1*a*, a time commensurate with the linear skew of that bit (shown by the arrow 23) must be considered as an acceptable length of time within which the data bit 24 may be received after the data bit 25 is received. The same length of time must be provided before the data bit 25 is received in order to accommodate the data bit 26, which arrives at the transverse line 20 before the data bit 25. The accommodation of these bits is considered in terms of data processing machine time. In other words, the first time at which a data bit 26 may be received and the last time at which a data bit 24 may be received determines the length of time allotted to each row 19. Furthermore, since the skew condition shown could be reversed as shown in FIG. 1*b* (i.e., the lower track 11 might arrive at the transverse line 20 in advance of the upper tracks 17), a bit 27 may lead and a bit 28 may lag by amounts commensurate with the lead and lag of bits 26 and 24, respectively. Therefore, the timing for each bit may be considered with respect to a nominal or central time (for instance, the time at which the data bit 25 will be received) in order to accommodate either of the two possible skew conditions. In other words, there is a length of time set aside for reading each row of bits 19, which is double the length of time by which a data bit in an outer track 11, 17, may lead or lag a bit in the central track 14.

Referring to the record 10*b* in FIG. 2, a data pattern which reflects this characteristic of skew is shown having 500 bits per inch in the outside track, with density increasing to a maximum of 2,000 bits per inch in a central timing track. This is possible since the distance variation resulting for a maximum skew condition for the outer track (as shown by the arrows 30) is greater than is necessary for track successively closer to the center (as illustrated by the arrows 31). The pattern of FIG. 2 is arbitrary and is shown for purposes of illustration only. Note that this is an 11-track pattern and the density, as shown, is 23 data bits (plus the central-track timing bits not used for data) for each bit in the outside track. This is more than double the 11 bit density which would be achieved by using a density of 500 bits per inch in straight, parallel recording. If a slightly different pattern were chosen, that is, one which had bits at the maximum density defined by the skew, an even greater increase in density could be achieved. Furthermore, the increase in density is greater as the number of tracks increases.

In FIGS. 3*a* and 4*a*, a double seven-bit pattern on a magnetic tape 10*c* is shown having a central track of timing bits 41, an upper adjacent track of data bits 42 recorded at the same density as the timing bits 41, and a lower adjacent track of data bits 43 similar to the data bits 42. Additionally, there are provided tracks of data bits 44, 45, which are recorded at one half the density of the timing bits 41 and data bits 42, 43. The outside tracks contain data bits 46, 47, which are recorded at one quarter of the density of timing bits 41. In FIG. 3*a*, means are provided for properly spacing the various bits on one half of a tape 10*c*, similar circuitry (not shown) being contemplated for spacing bits on the lower half of the tape 10*c*. The timing bits 41 designate the boundaries of the locations of the various bits. When the bits are to be read, the circuit of FIG. 4*a* will synchronize itself with the bits on the tape 10*c* by means of the timing bits 41 which are recorded on the tape concurrently with the data bits.

Referring to the extreme left-hand side of FIG. 3*a*, a plurality of data input lines 50 receive data from a computer or data processing apparatus. The lines 50 feed a respectively corresponding plurality of AND circuits 51 which simultaneously gate the data into a data input register comprised of a plurality of triggers 53. The AND circuits 51 are simultaneously gated by a signal supplied to a line 54 by a delay unit 55, the operation of which will be described hereinafter.

Each of the input lines 50, together with a corresponding AND circuit 51 and trigger 53, represents a data designation. The object of the circuitry shown in FIG. 3a is to record the different data designations onto the tape 10c within the seven-bit pattern shown comprising the bits 42, 44 and 46. Therefore, it is essential that the data designations be selectively gated according to some plan which will guarantee that a data bit of a particular designation will be recorded in the same place within the data pattern on the tape 10c each time so that the designation intended for the data bit can be determined subsequently when the record is sensed.

In order to achieve this gating, a master clock 56 of any well-known type is adjusted to a frequency corresponding with the nominal tape speed. It is not essential that this clock be at a precise relationship with respect to the exact speed of the tape, its only function being to regulate the nominal density of the bits within a fairly wide range of permissible densities. The clock 56 sends pulses over a line 57 to an eight-stage ring 58 which is of the closed type, as shown, for example, in Richards, R. K., Arithmetic Operations in Digital Computers, Princeton, New Jersey, D. Van Nostrand Company, Inc., 1956, pages 205–208. Thus, for each pulse supplied to the ring 58 over the line 57, the ring will step successively from a first stage designated R (for reset) to successive stages designated from 1 through 7 and, after being set at the 7-stage, the next input pulse on line 57 will step the ring back to the R-stage. The ring stages R, 1, 2, . . . 7 are divisions of the length of time within which any one data pattern may be recorded on the magnetic tape 10c. This time is equal to the length of time between the central point of successive spaces within which data bits 46 may be recorded in the outside tracks of the magnetic tape, taking into account the maximum skew accountability characteristics of the system in use.

Each of the stages of the eight-stage ring 58 is utilized to gate the output signals of a different trigger 53 into a respectively corresponding one of a plurality of recording heads 59–62 so as to achieve recording in a pattern in accordance with the present invention. Specifically, the R-stage, 2-stage, 4-stage and 6-stage of the ring 58 are passed through an OR circuit 63 for amplification and shaping in an amplifier 64 and are subsequently recorded on the tape by a timing track recording head 59. Since the first data bit in the pattern is the data bit 42 to be written in the track adjacent to the timing track, the 1-stage of the ring 58 is connected by a line 66 to an AND circuit 67, which AND circuit is also supplied data bits from a corresponding trigger 53 over a line 68. If a ONE has been stored in the related trigger, the AND circuit 67 will supply a signal over a line 69 through an OR circuit 70 which is connected by a line 72 to the input on the amplifier 71. The amplifier shapes, amplifies and applies the signals, via a line 73, to the second track recording head 60, which records the first bit 42 on the track. If a ZERO has been designated by the corresponding trigger 53, the AND circuit 67 will have no output and no bit will be recorded. Similarly, the 2-stage of the ring 58 is connected by a line 74 to another AND circuit 75 which can receive signals over a line 76 from a respectively corresponding trigger 53. If the trigger has a ONE stored therein, the AND circuit 75 will send a signal over a line 77 through an OR circuit 78 and over a line 79 for shaping and amplification in an amplifier 80. An amplified signal on a line 81 is thereby provided to the third track recording head 61 for recording the first one of the bits 44 in the third track. Each of the other stages of the ring 58 is connected in like manner to a corresponding AND circuit for gating the output signals of related triggers onto the correct tracks at proper times.

The R-stage of the ring 58 is connected by a line 85 to the delay unit 55, the output of which, on line 54, represents the "data-in gate" previously described as serving to gate the data on the input line 50 through the AND circuit 51 over lines 52 into the triggers 53. The delay unit 55 is necessary so that the data will be gated into the triggers 53 at the end of a reset pulse applied by a line 86 to each of the triggers 53, which resets the triggers after the data therein has been recorded on the tape. The delay time of the delay unit should be less than the duration of the reset signal on line 86, depending on how long it takes the triggers to be reset after the application of the leading edge of the reset signal on the line 86. Similarly, the duration of the delay unit output signal may be regulated by means of a pulse shaper, such as a well-known single shot multivibrator, and the "data-in gate" on line 54 could thereby be made to have such duration as is suitably capable of setting the triggers 53. It should be understood that, when an actual application of this invention is contemplated, other suitable ways of achieving synchronized reset and gating of input data could be chosen to suit design expediency.

Thus, the normal cycle of operation for recording on the tape, as seen in FIG. 3b, is as follows: the clock 56 sets the ring 58 to the R-stage and the line 86 resets each of the triggers 53. Thereafter, data is gated into the triggers 53 by the "data-in gate" on line 54. The clock 56 then steps the ring 58 to the 1-stage and data on the line 68 is gated into the recording head 60, as before described. Similarly, each other data bit is recorded onto the proper position on the tape before the next subsequent setting of the ring 58 to the R-stage.

The circuits for reading data recorded in the manner just described are shown in FIG. 4a. In FIG. 4a, reading heads 90–93 are provided, which respectively correspond to the recording heads 59–62. The timing bits 41 in the timing track are sensed by the reading head 90, passed over a line 94 through an amplifier 95, over a line 96 and into a four-stage closed ring 97. The stages of this ring are designated R, 2, 4 and 6 to correspond with the timing signals which cause the recording of the timing bits 41. The operation of the reading circuits in FIG. 4a is based on providing a gate signal for each possible data bit 42, 44, 46 which may appear on the tape 10c, which gate is on for a length of time equal to the permissible time within which each bit may appear commensurately with the maximum skew accommodation characteristics defined for the actual device in use. Since the data bits 46 in the outside timing track themselves define the maximum skew characteristic, no gate is necessary and bits read by the outer track reading head 93 are passed over line 98, through an amplifier 99 to a trigger 100 via a line 101.

For the second and third tracks, gate signals have to be provided so as to recognize the data significance of the bits 42, 44. More specifically, the first one of the bits 42 to appear in the reading head 91 will correspond to the first bit recorded by the writing head 60. This has a different data significance than the other bits 42 in the same track. Therefore, in order to distinguish between these bits, it is necessary to recognize the time in which each bit is sensed by the reading head 91.

In order to achieve the necessary recognition of the data value of the bits 42, 44, as determined by their times of occurrence beneath a reading head 91–92, and yet maintain the skew accommodation characteristics of the present invention, "GATE" signals of various widths are provided, as shown in FIG. 4b. Specifically, the bits 44 in the third track are provided with gates having twice the duration of the bits 42 in the second track; these include GATE 2 (which centers around 2-time) and GATE 6 (which centers around 6-time). It is to be noted that the recording head 61 in FIG. 3a can receive signals from triggers 53 as the result of gating by either the 2-stage or the 6-stage of the ring 58. Therefore, the central, or non-skew position of the bits 44 in the third track, occur at 2-time and 6-time. In a similar fashion, GATE 1 accommodates the first bit gated through the recording head 60 (which was applied at 1-time), GATE 3 accommodates the second bit 42 recorded by the recording head 60 (which occurs at 3-time), GATE 5 accommodates the third bit 42 recorded by the recording head 60 (which occurs at 5-time), and GATE 7 accommodates the fourth data bit recorded by the recording head 60 (which occurs at 7-time). Note that there is no "GATE 4" since this would occur at 4-time, which is the time the bit 46 in the outside track is recorded by head 62 and, as before described, no gate is provided for this bit since it is the limiting factor in the skew characteristic of the this system.

Each of the stages R, 2, 4, and 6 of the four-stage ring 97 are connected by respectively corresponding lines 105–108 to a plurality of triggers 109–114. By way of example, the trigger 112 serves to provide a GATE 1 signal to a corresponding AND circuit 118, which AND circuit gates the bit 42 recorded at 1-time. Since this bit can occur, depending upon the skew condition of the tape at the time that the bit passes beneath the reading head 91, anywhere from the beginning of R time to the end of 2-time, the R signal on line 105 is used to turn the trigger 112 on and the 2-pulse on line 106 is used to turn the trigger 112 off. Therefore, the AND circuit 118 will pass a data signal on a line 124 only if it falls within the permissible range of time. If the data signal appears before the GATE 1 signal has conditioned AND circuit 118, it will be recognized as a bit appearing at 7-time; if a signal appears on the line 124 after the extinction of GATE 1, it would be recognized as a signal appearing at 3-time.

The sequence of operation of the reading circuits begins with a signal on a line 105 from the R-stage of the ring 97, which signal is in fact the first signal of each reading sequence. The line 105 supplies a signal to a delay unit 127, the output of which transmits a delayed gating signal on a line 128. Referring to FIG. 4*b*, it can be seen that the delay of the delay unit 127 is chosen so that it will provide a "RESET" gate at the end of the R-signal on a line 128 so that data may be gated out of a plurality of data-out register triggers 100 by the R-signal on line 126 prior to the resetting of the triggers by the "RESET" signal on line 128.

At R-time, a signal on line 105 is applied to turn on triggers 112 and 114, indicating the beginning of GATE 1 and GATE 2. Next, at 2-time, a signal is applied on line 106 to turn off trigger 112, indicating the end of GATE 1 and to turn on trigger 111, indicating the beginning of GATE 3. At 4-time, a signal on line 107 will turn on triggers 110 and 113, indicating the beginning of GATE 5 and GATE 6 and will turn off triggers 111 and 114, indicating the end of GATE 2 and GATE 3. At 6-time, the signal on line 108 will turn on trigger 109, indicating the beginning of GATE 7, and will turn off trigger 110, indicating the end of GATE 5. R-time, a "data-out gate" will appear on line 126 to gate the output data stored in each of the triggers 100 of the data output register through the output AND circuits 129 to corresponding output lines 130, and will also turn off triggers 109 and 113, indicating the end of GATE 6 and GATE 7, and foreclosing the reading of any further data from the data record which has just been read. Subsequently, after the expiration of the delay on delay unit 127, the signal on line 128 will reset each of the triggers 100 in preparation for receiving the next group of data from the tape 10*c*.

While the invention has been particularly shown and described with reference to preferred embodiments thereof, if will be understood by those skilled in the art that various changes in the form and details may be made therein without departing from the spirit and scope of the invention.

What is claimed is:

1. In a data processing machine of the type utilizing a translating record and having a maximum potential skew, said maximum potential skew imparting different, successively-greater maximum potential linear skew for data bits recorded on each subsequent track closer to the outside edges of the record, there being no skew recognized in a reference track of said record, the method of recording which comprises recording data manifestations in each of said tracks at a maximum density substantially inversely proportional to said maximum potential linear skews.

2. For use with a recording reproducing machine of the type in which a translating record has a maximum potential skew with respect to the recording and/or reproducing apparatus, said maximum potential skew of said record causing a first maximum potential linear skew for data bits in the outside tracks of said record, and successively decreasing maximum potential linear skews for data bits on tracks successively closer to a reference track on said record, said reference track having no skew, the method of recording which comprises recording data manifestations in each of said tracks of said record, the maximum density of said manifestations in each of said tracks being substantially inversely proportional to said maximum potential linear skews.

3. For use with a recording and reproducing machine of the type in which a translating record has a maximum potential skew with respect to the recording and/or reproducing apparatus, said maximum potential skew of said record causing a first maximum potential linear skew of data bits in the outside tracks of said record, and succesively decreasing maximum potential linear skew of data bits on tracks successively closer to a reference track on said record, said reference track having no skew, the method of recording which comprises selectively recording data manifestations at index positions in each of said tracks, said index positions in each of said tracks being separated from adjacent index positions on the same track by increments of distance, the increments of distance being substantially directly proportional to said maximum potential linear skews.

4. For use with a recording and reproducing machine of the type in which a translating record has a maximum potential skew with respect to the recording and/or reproducing apparatus, said maximum potential skew of said record causing a first maximum potential linear skew of data bits in the outside tracks of said record, and successively decreasing maximum potential linear skews of data bits on tracks successively closer to a reference track on said record, said reference track having no skew, the method of recording which comprises recording data manifestations in each track of said record, the manifestations separated by increments of distance from adjacent manifestations on the same track, the minimum increments of distance on each of said tracks being substantially directly proportional to the transverse displacements of each of said tracks from said reference track.

5. For use with a recording and reproducing machine of the type in which a translating record has a maximum potential skew with respect to the recording and/or reproducing apparatus, said maximum potential skew of said record causing a first maximum potential linear skew of data bits in the outside tracks of said record, and successively decreasing maximum potential linear skews of data bits on other tracks successively closer to a reference track on said record, said reference track having no skew, the method of recording which comprises:

recording data manifestations on said outside tracks of said record at positions separated by increments of distance equal to the linear displacement corresponding to said first maximum potential linear skew; and recording data manifestations on said other tracks of said record successively closer to said reference track at increments of distance substantially directly proportional to said maximum potential linear skews of said other tracks.

6. For use with a recording and reproducing machine of the type in which groups of related data designations are recorded on, and subsequently reproduced from, a translating record which has a maximum potential skew with respect to the recording and/or reproducing apparatus, said maximum potential skew of said record causing a first maximum potential linear skew of data designations manifested in outside tracks of said record, and successively decreasing maximum potential linear skews of data designations manifested on tracks successively closer to the center of said record, the central-most track of said record having no skew, the method of recording which comprises:

recording a manifestation of a first data designation of each group at successive positions on said outside tracks of said record separated by increments of distance equal to said first maximum potential linear skew;

recording manifestations of second and third data designations on a second track adjacent said outside track at successive positions on said track separated by increments of distance equal to one half the distance of said increments on said outside track;

and recording manifestations of fourth, fifth, sixth and seventh designation on a third track which is adjacent to both said second track and a central-most track of said record, at successive positions separated by increments of distance equal to one half the distance of said increments on said outside track;

7. In a data processing machine in which a record having a plurality of linear data tracks is translated past recording and reproduction stations, the record exhibiting a maximum potential skew with respect to the stations past which it is translating, the skew occurring in random fashion, the data recording apparatus, comprising:

a plurality of storage means, each respectively corresponding to a data designation manifestation;

a plurality of recording means, each respectively corresponding to one of the tracks on said record and to at least one of said storage means, certain ones of said recording means corresponding to more than one storage means, each of said storage means corresponding to only one of said recording means, said recording means being selectively operable to record data manifestations on said record;

timing means, having a plurality of outputs, for designating the times at which data may be recorded on said record, said timing means responding at a different one of said outputs for each one of said times;

and a gating means for each of said storage means, each of said gating means being concurrently responsive to the respectively corresponding one of said storage means and to a particular one of said outputs for transmitting data manifestations from the corresponding storage means to a selected one of said recording means.

8. In a data processing machine in which a record, having a plurality of linear data tracks and a timing track, is translated past recording and reproduction stations, the record exhibiting a maximum potential skew with respect to the stations past which it is translating, the skew occurring in random fashion, the data recording apparatus, comprising:

a plurality of first storage means, each respectively corresponding to a data designation manifestation;

a plurality of first recording means, each respectively corresponding to one of the data tracks on said record and to at least one of said first storage means, some of said first recording means corresponding to only one of said first storage means and others corresponding to at least two of said first storage means, each of said first storage means corresponding to only one of said first recording means, said recording means being selectively operable to record data manifestations on said record;

first timing means, having a plurality of outputs, for designating the times at which data may be recorded on said record, said first timing means responding at a different one of said outputs for each one of said times;

a plurality of first gating means, one for each of said first storage means, each of said first gating means being concurrently responsive to the respectively corresponding one of said first storage means and to a particular one of said outputs for transmitting data manifestations from the corresponding storage means to a selected one of said recording means;

a second recording means corresponding to said timing track and concurrently responsive to all of the outputs of said timing means to record timing manifestations in said timing track;

a plurality of first sensing means, each respectively corresponding to one of said data tracks, each for sensing data manifestations recorded by a corresponding one of said first recording means;

a second sensing means for sensing the timing manifestations in said timing track;

a plurality of second storage means, each respectively corresponding to one of said first storage means;

a second timing means responsive to said second sensing means for designating the times at which different ones of said data manifestations may be sensed, said second timing means responding at different ones of a plurality of outputs for each one of said times;

and a plurality of second gating means, one for each of said second storage means, each concurrently responsive to said timing means and to one of said second sensing means to translate data designations sensed thereby to the corresponding one of said second storage means.

References Cited by the Examiner

UNITED STATES PATENTS

| | | | |
|---|---|---|---|
| 2,628,346 | 2/1953 | Burkhart | 340—174.1 |
| 2,793,344 | 5/1957 | Reynolds | 340—174.1 |
| 2,813,259 | 11/1957 | Burkhart | 340—174.1 |
| 2,907,989 | 10/1959 | Guerber | 340—174.1 |
| 2,937,239 | 5/1960 | Garber et al. | 340—174.1 |
| 2,948,884 | 8/1960 | Guerber | 340—174.1 |
| 2,991,452 | 7/1961 | Welsh | 340—174.1 |

IRVING L. SRAGOW, *Primary Examiner.*